US006300549B1

(12) United States Patent
Gregory

(10) Patent No.: US 6,300,549 B1
(45) Date of Patent: Oct. 9, 2001

(54) FIVE STRING ELECTRIC GUITAR

(76) Inventor: Maestro Alex Gregory, 6032 Colfax Ave., North Hollywood, CA (US) 91606

( * ) Notice: Subject to any disclaimer, the term of this patent is extended or adjusted under 35 U.S.C. 154(b) by 0 days.

(21) Appl. No.: 09/596,643

(22) Filed: Jun. 19, 2000

Related U.S. Application Data

(63) Continuation of application No. 09/350,387, filed on Jul. 9, 1999, now abandoned.

(51) Int. Cl.[7] ........ G01D 1/08
(52) U.S. Cl. ........ 84/267; 84/297 S; 84/312 R
(58) Field of Search ........ 84/267, 297 S, 84/312 R

(56) References Cited

U.S. PATENT DOCUMENTS 3,868,880 * 3/1975 Chapman ........ 84/267
5,113,737 * 5/1992 Gregory ........ 84/267
5,519,165 * 5/1996 Gregory ........ 84/293
5,600,079 * 2/1997 Feiten et al. ........ 84/312 R
5,728,956 * 3/1998 Feiten et al. ........ 84/314 R
5,814,745 * 9/1998 Feiten et al. ........ 84/312 R
5,955,689 * 9/1999 Feiten et al. ........ 84/312 R

* cited by examiner

*Primary Examiner*—Robert E. Nappi
*Assistant Examiner*—Kim Lockett
(74) *Attorney, Agent, or Firm*—Cislo & Thomas LLP

(57) ABSTRACT

A five-string guitar is tuned in fifths to provide better sound. A five-string guitar is tuned in fifths to provide better sound by providing better harmonic separation of the notes played and by reducing "muddiness" or lack of clarity in the heard note. A number of realized embodiments enable the five-string guitar to accommodate a wide variety of stringed-instrument musical needs and preferences.

17 Claims, 3 Drawing Sheets

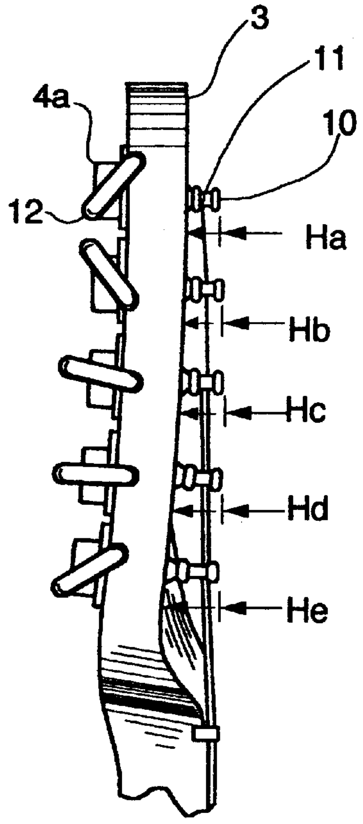
Fig. 2.
Fig. 3.
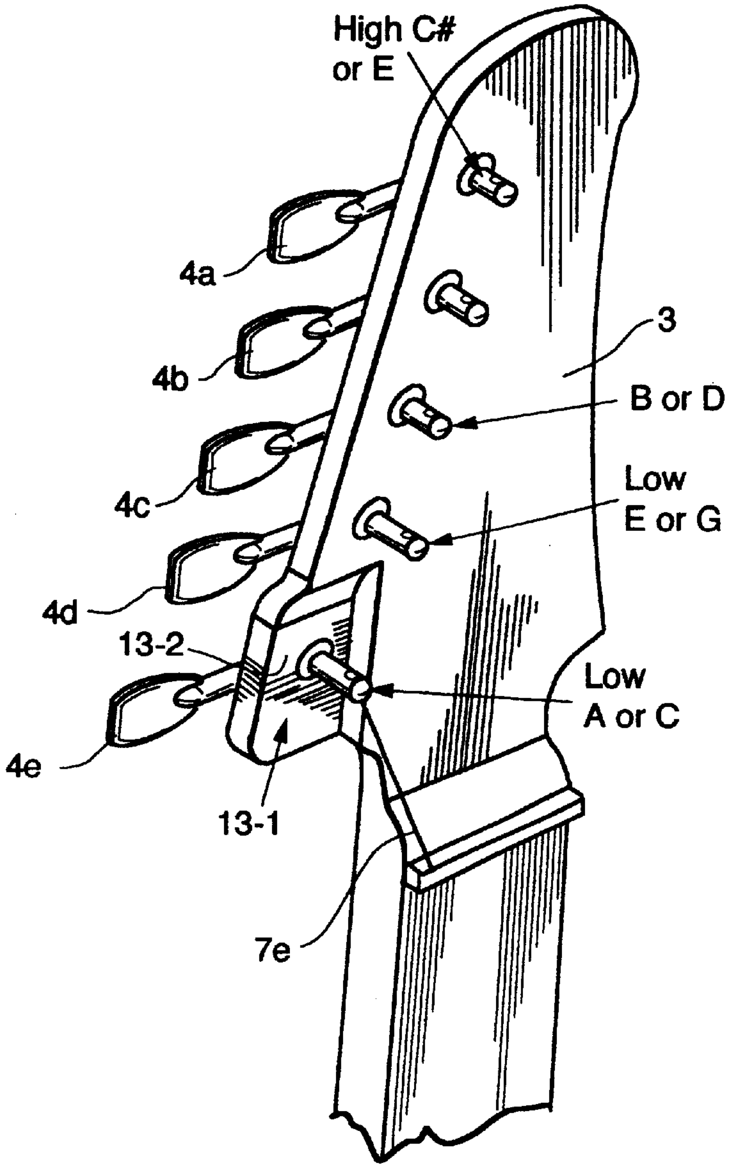

FIVE STRING ELECTRIC GUITAR

CROSS-REFERENCES TO RELATED APPLICATIONS

This is a continuation of U.S. patent application Ser. No. 09/350,387 filed Jul. 9, 1999 now abandoned in the name of the same inventor incorporated herein by this reference thereto.

BACKGROUND OF THE INVENTION

1. Field of the Invention

This invention pertains to the field of electronic musical instruments, and more particularly to electric guitars.

2. Description of the Related Art

The 7 STRING ELECTRIC GUITAR (U.S. Pat. Nos. 5,223,737 and 5,175,387) has in recent years been the subject of a popular fad by Hard-Core Metal, Techno, Rap, Industrial, etc. musicians who favor extremely low and extremely distorted sounds.

To such effect these musicians have been tuning the-commercially available 7 STRING ELECTRIC GUITAR to the following notes: B, E, A, D, G, B, E (from the lowest to the highest) or closely related variants of the same tuning.

The 7 STRING ELECTRIC GUITAR was originally designed for the specific use of a high string added and virtuoso playing.

The new breed of musicians are not really interested in virtuoso playing and making full use of the well laid out range of the 7 STRING ELECTRIC GUITAR, but restrict themselves to rhythmic phrases on the lowest strings with an extreme amount of distortion.

The 7 STRING ELECTRIC GUITAR, not having been invented for that type of approach, has consequently several shortcomings, which are cause of extreme frustration with such players.

The biggest problem is the inevitable muddiness of the sound created by the closeness of harmonics of very low notes generated by an instrument (the ELECTRIC GUITAR) which is tuned in fourths, with little harmonic separation to begin with, emphasized by the intense gain generated in the amplification.

The bottom string, to be consistent with the other strings of the standard set that these musicians use, is generally pretty light and adds to the floppiness of feel and discomfort, which is in all cases intrinsic to any low string added to any ELECTRIC GUITAR with no dedicated design.

What these musicians really play are supportive rhythm parts which sonically sit in between the bass and the standard rhythm guitar, which is relative in range to the position of a CELLO in a classical orchestra.

The present inventor has come to the unorthodox conclusion that marrying the 7 STRING ELECTRIC GUITAR with the classical VIOLONCELLO, he can create a totally new instrument which perfectly resolves all the problems of a 7 STRING ELECTRIC GUITAR tuned with a low string added and played with maximum distortion. In fact, the resulting instrument goes well beyond the purpose for which it has been originally conceived and yields something unexpected both in versatility and performance.

The classical VIOLONCELLO, commonly known as CELLO, is somewhat limited as it only has four strings (i.e.: three less than the 7 STRING ELECTRIC GUITAR) tuned to the notes of low C, G, D, A, but has clarity and definition because of separation of the harmonic overtones, created by the "spread" tuning in fifths. Also, the Classical CELLO is a fully acoustic instrument and is played with a bow, as opposed to the GUITAR, which is played with a plectrum.

The Classical CELLO is obviously most unsuited to the musical demands and techniques of the new breed of musicians, but some of its best features can be manipulated in an unorthodox manner and incorporated in the 7 STRING ELECTRIC GUITAR.

The process is not really logical, but the results are perfect. The new tuning of the 7 STRING ELECTRIC GUITAR, as we said, is currently B, E, A, D, G, B, E or thereabout. If we think in terms of notes as opposed to musical instruments or engineering, that means that the current 7 STRING GUITAR has a range that only covers a semi-tone lower than the Classical CELLO and 7 semi-tones higher.

Nevertheless, by the addition of the next higher fifth to the tuning of the classical CELLO, i.e.: a high E we have the full range of the 7 STRING ELECTRIC GUITAR, with only a low semi-tone missing.

If this tuning is applied to the 7 STRING ELECTRIC GUITAR, the 7 STRING ELECTRIC GUITAR is now a 5 STRING ELECTRIC GUITAR tuned in fifths and with almost the exact range.

If the scale is increased from the standard scale of the 7 STRING ELECTRIC GUITAR of 25.5 inches to a maximum of 26.25 inches the tension of the strings is increased enough to remove a great deal of floppiness from the bottom strings but without causing playability problems to a guitarist, who, obviously has not go the finger spread of a bass player.

Now the scale being ¾" longer it is possible to add 3 extra frets to the new musical instrument without any spacing problem, gaining 3 more semi-tones, in the upper region, i.e.: ending up with a whole tone more range than the 7 STRING ELECTRIC GUITAR, with only 7 STRING ELECTRIC GUITAR, with only 5 strings.

But if the new breed of player prefers low sounds, why not move the low C down to a low A, giving an even ore extreme low end?

The result is excellent as we now have a new instrument that has exactly the same highest note as a 7 STRING ELECTRIC GUITAR along with the newly described tuning. In fact, the 7 STRING ELECTRIC GUITAR has 24 frets and the highest string is an E, consequently the $24^{th}$ fret will also be an E.

If the new instrument goes up in fifths from a very low A, it will be tuned to the notes of A, E, B, F#, C# and the $27^{th}$ fret on the C# string will also be a high E.

This new instrument is clearly superior to the 7 STRING ELECTRIC GUITAR, when the added string is a lower note.

In fact, the longer scale gives way better tension and response to the otherwise very floppy low string. The tuning in fifths gives far more definition, as the harmonic separation clears any muddiness exacerbated by massive amplification gain and distortion.

The reduction of strings to only 5 allows the use of thicker strings (it is obviously much easier to play a smaller neck, width-wise, and fewer strings, therefore the player can afford to use some of the automatically gained strength to easily deal with the challenge of thicker strings) drastically improving the tone of the instrument (it is common knowledge that thicker strings sound better than thin ones, though are harder to play) and its punch.

Therefore, the preferred embodiment of the CELLO-BLASTER is a 5 STRING ELECTRIC GUITAR-SIZED instrument tuned in fifths from a very low A, with a scale of 26.25 inches and 27 frets.

Obviously, some may like the alternative tuning of C, G, D, A, E and such tuning (or any in between) is still totally compatible to the instrument, the only difference being that the player will have to use a lighter gauge of strings, to compensate for the higher pitch.

Due to the length of the scale, a standard straight headstock is perfectly functional, and the use of staggered headmachines is desirable.

Whenever the manufacturing of the COMPOUND HEADSTOCK (as claimed in my U.S. Pat. No. 5,519,165) is not a problem, then the alternative scale of 25.75 inches can be used to the same effect, but with improved playability for players with small hands.

The COMPOUND HEADSTOCK will only be used for the lower string (very low A or C) and the other four strings will be wound around the posts of headmachines laying in line on a straight plane.

One magnetic pick-up the bridge position is sufficient on this instrument which specifically provides low end massive distortion, but as many pick-ups as desirable can be used.

Though a standard vintage Fender Stratocaster style bridge unit with 5 height adjustable saddles with a width of 0.440 inches is perfectly functional for this purpose and can easily be manufactured with existing tooling, the ideal bridge unit should have similar saddles but with a width of 0.485 inches to compensate for the thicker strings to be used in any case.

In this case, obviously the spacing of the pole pieces on the magnetic pick-ups fitted on the CELLOBLASTER will have to match the saddles and be 0.485 inches center to center.

SUMMARY OF THE INVENTION

The present invention provides a new electric guitar-sized instrument which has a musical place in its own right, but, amongst other things, fully outperforms the 7STRING ELECTRIC GUITAR, when the 7 STRING ELECTRIC GUITAR is tuned with an added low string instead of an added high string, because of its LOW RANGE DEDICATED DESIGN.

A feature of the invention is 5 strings tuned in fifths starting from a very low A or very low C (or anything in between).

A second feature of the invention is a scale length of 26.25 inches if a standard straight headstock width for headmachines in line is used or a scale length of 25.75 inches if a compound headstock is used for the lowest string and the other four headmachines lay in line on a straight plane.

A third feature of the invention is 27 frets, which, due to the increased scale length in comparison to the standard 25.5 inches, have the same access as 24 on the shorter scale and allow to widen the range to the same highest note of a 7 STRING ELECTRIC GUITAR with 2 strings less.

A fourth feature of the invention is that it has a preferably solid body and double cutaway so that it can be easily over-driven to extreme levels of distortion with no feedback problems and full access.

A fifth feature of the invention is the clarity and definition created by the harmonic separation consequent to the tuning in fifths opposed to the traditional tuning of the guitar in fourth and a major third.

A sixth feature of the invention is an improved version of the vintage Fender Stratocaster non-tremolo bridge unit, where the center to center of the saddles will be 0.485 inches instead of 0.440 inches to compensate for the thicker strings being used.

A seventh feature of the invention is the greatly improved playability provided by the lesser number of strings and consequent reduction in fingerboard width gives the player spare energy and strength to use thicker strings than standard with a great improvement in tone and sound over the traditional 7 STRING ELECTRIC GUITAR or 6 STRING ELECTRIC GUITAR.

An eighth feature of the invention is that the reduced number of strings and overall width of the bridge unit makes "muting" (damping of not played strings to stop them from freely sounding) much easier than even a 6 STRING ELECTRIC GUITAR, a feature which is massively important when extreme levels of amplification gain and distortion are required.

BRIEF DESCRIPTION OF THE DRAWINGS

FIG. 2 is a side view of the headstock of the CELLOBLASTER when a scale of 25.25 inches is used and a straight headstock with staggered headmachines;

FIG. 3 is a front prospective view of the headstock of the CELLOBLASTER when a scale of 25.75 inches is used and a compound headstock with staggered headmachines;

DESCRIPTION OF THE PREFERRED EMBODIMENT(S)

Figure 1:
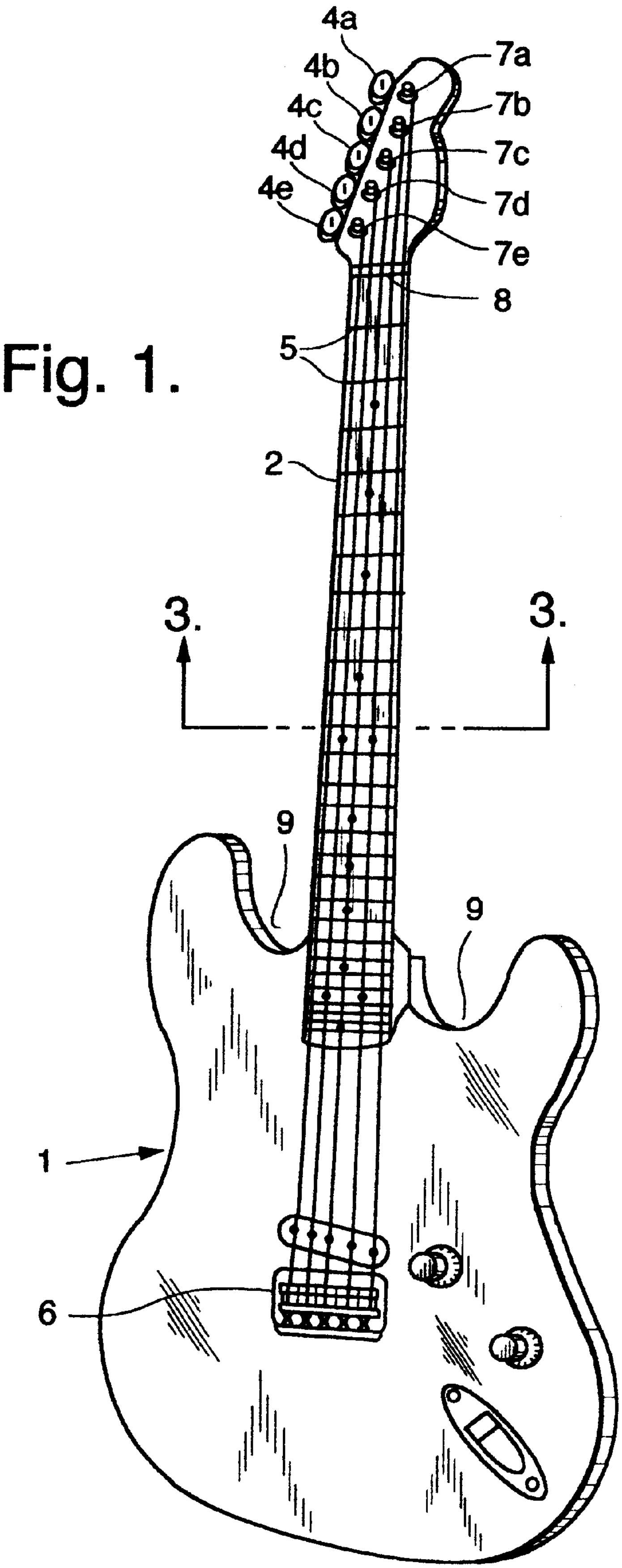
FIG. 1 is a top plane view of the CELLOBLASTER.

Referring now to the drawings, there is illustrated in FIG. 1 a top plane view of the CELLOBLASTER. The CELLOBLASTER has a solid (or semi-solid) body 1 (ideally made of poplar wood, or poplar and spruce, or koa and maple, where the spruce or the maple are only a 0.25" thick top portion) and a neck 2 connected to the solid body 1.

The neck has a headstock portion 3 upon which are mounted five staggered headmachines 4*a*–4*e*. The neck 2 has 27 frets 5 and has a scale length, the distance from a nut to the bridge saddles, of either 26.25 inches or 25.75 inches, relative to either a standard headstock FIG. 3 or a compound headstock FIG. 4 being used for the construction of the instrument.

Topmounted on the solid (or semi-solid body) is a bridge unit 6. The CELLOBLASTER has five strings 7*a*–7*e*, and end of each string 7 being attached to a headmachine and the other end of the string 7 being connected to the bridge unit 6. Each string 7 compressively rests on a nut 8 situated between the frets 5 and the headmachines 4*a*–4*e*. Although the thickness of the strings can vary, in the preferred embodiment there will be 2 string sets: the "RHYTHM FROM HELL" set and the "NEOCLASSICAL" set. The "RHYTHM FROM HELL" set will be suited for the CELLOBLASTER being tuned to the following notes: A, E, B, F#, and C# from the lowest to the highest string. The "NEOCLASSICAL" set will be suited for the CELLOBLASTER being tuned to the notes of C, G, D, A, and E starting from the lowest string. The "RHYTHM FROM HELL" set will comprise: a wound (ideally copper-wound) low A string with 0.075 inch diameter, a wound (ideally copper-wound) E string of 0.050 inch diameter, a wound (ideally copper-wound) B string of 0.035 inch diameter, a plain steel F# string of 0.019 inch diameter and a plain steel top C# string of 0.0115 inch diameter.

The "NEOCLASSICAL" set will comprise: a wound (ideally copper-wound) low C string of 0.067 inch in diameter, a wound (ideally copper-wound) G string of 0.043 inch in diameter, a wound (ideally copper-wound) D string of 0.029 inch in diameter, a plain steel A string of 0.016 inch in diameter and a plain steel top E string of 0.010 inch in diameter.

The solid body 1 has double cutaways 9 near the neck 2 of the CELLOBLASTER so that the guitarist will have access to the frets 5 located on the neck nearest to where the neck 2 is joined to the solid (or semi-solid) body 1.

FIG. 2 provides a more detailed view of the staggered headmachines 4a–4e. Each headmachine provides the mechanism for tuning a string 7 of the CELLOBLASTER. The headmachine has a post 10 around which a string is wrapped, a base portion 11 that is located adjacent to the headstock 3 and a tuning lever 12 which, when turned, rotates the post 10. The posts are of "staggered" or "varying" heights and are noted in FIG. 2 as Ha–He. In the preferred embodiment, the posts 10 are of the following heights: The posts associated with the low A and E strings (or low C and G strings) are 1 inch high, the posts associated with the B and F# strings (or D and A strings) are 15/16$^{th}$ of an inch high and the post associated with the top C# string (or top E string) is 7/8$^{th}$ of an inch high. Standard Kluson type vintage Stratocaster headmachines used on Stratocasters have 1 inch high posts. When installed onto the headstock 3 of the CELLOBLASTER and held in place by base plates 11, the posts rise from the surface of the headstock by the following distances: The posts associated with the low A and E strings (or low C and G strings) are 7/16 of an inch; the posts associated with the B and F# strings (or D and A strings) are 6/16 of an inch and the post associated with the high C# string (or high E string) is 5/16 of an inch.

The staggered headmachines 4a–4e are an important feature because they help to balance correctly the tension of each individual string in relation to the next, but varying the degree angle of string breakage from the nut. The greater the degree angle the tighter the string, the lesser the angle the looser the string and unless the headmachines associated with the higher tone and thinner strings are lowered with respect to the headstock 3, those strings 7 would not be pulled tightly enough against the nut 8 and would tend to flop and vibrate against the nut 8 during playing. The possible remedy of utilizing a string tree is not desirable because of string breakage problems and because it would not allow finer balancing of the two top strings, which in the CELLOBLASTER have different post heights and consequently different levels of tension while FIG. 2 shows the preferred embodiment of string tensions and headmachine heights when a standard headstock is used on the CELLOBLASTER with a scale length of 26.25 inches.

FIG. 3 indicates further refinement of the string tensions and balance by the use of the COMPOUND HEADSTOCK, necessary when one wants to reduce the scale length of the CELLOBLASTER to 25.75 inches to facilitate the playing of the instrument by people with small hands.

Figure 4:
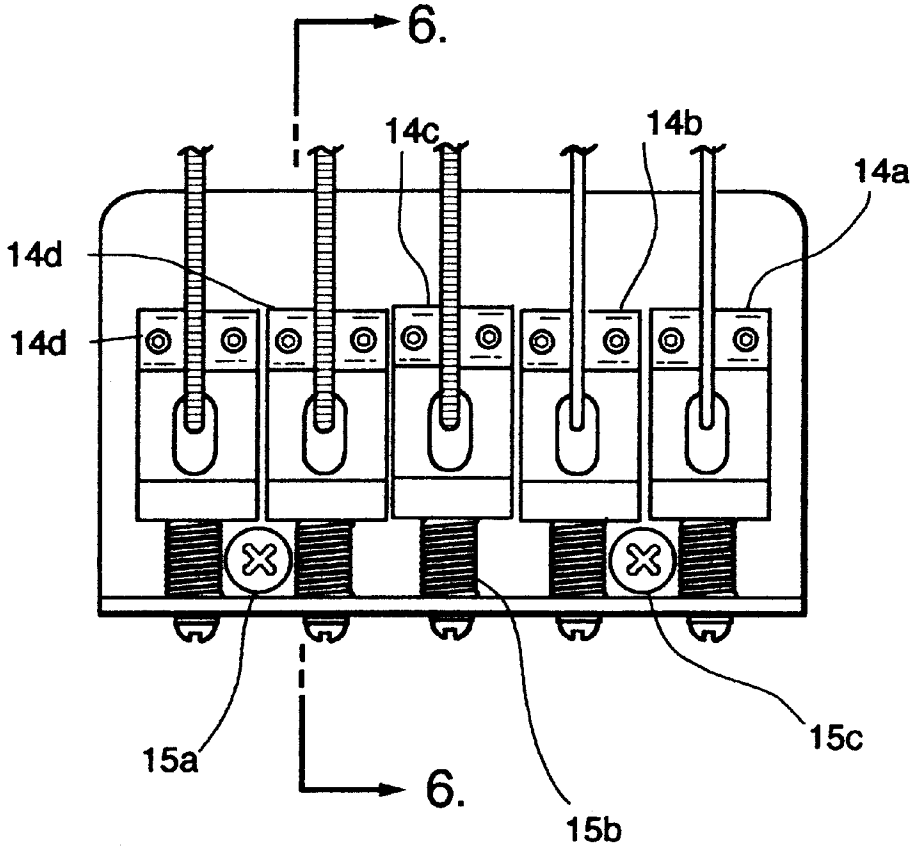
FIG. 4 is a front view of a 5 string version of the vintage Fender Stratocaster nontremolo bridge unit.

FIG. 4 shows further development of the COMPOUND HEADSTOCK as described in FIG. 7 of my prior U.S. Pat. No. 5,519,165.

The headmachines 4a–4e are all arranged on one side of the headstock 3 and headmachine 4e is installed beneath the scooped area 13-1 such that its post projects from the surface 13-2 so that string 7e is disposed to an angle of approximately 22° (or varying between 40° and 20° if a further dedicated design is viable to the manufacturer to cater for different tastes in tuning) with reference to the plane in which the strings occupy between nut 8 and bridge 6.

In any case the heights of the posts of the headmachines 4a–4e in FIG. 3 will be the same as the heights of the posts of the headmachines 4a–4e in FIG. 2 as the only serious tension problem caused by the shortening of the scale length from 26.25 inches to 25.75 inches will relate to the bottom strings of either low A or low C.

Shortening of the scale will result in loss of tension, which in the case of the CELLOBLASTER, is only seriously critical for the lowest string, but the compound headstock will bring back the tension to such lowest string keeping it from rattling.

FIG. 4 illustrates a 5 string version of the vintage Fender Stratocaster non-tremolo bridge unit 6 where the height and length adjustable saddles+14a–14e have a width of 0.440 inches, which is acceptable for the functioning of the CELLOBLASTER.

The bridge unit is firmly connected to the body 1 with three screws (size 8) 15a, 15b and 15c.

Figure 5:
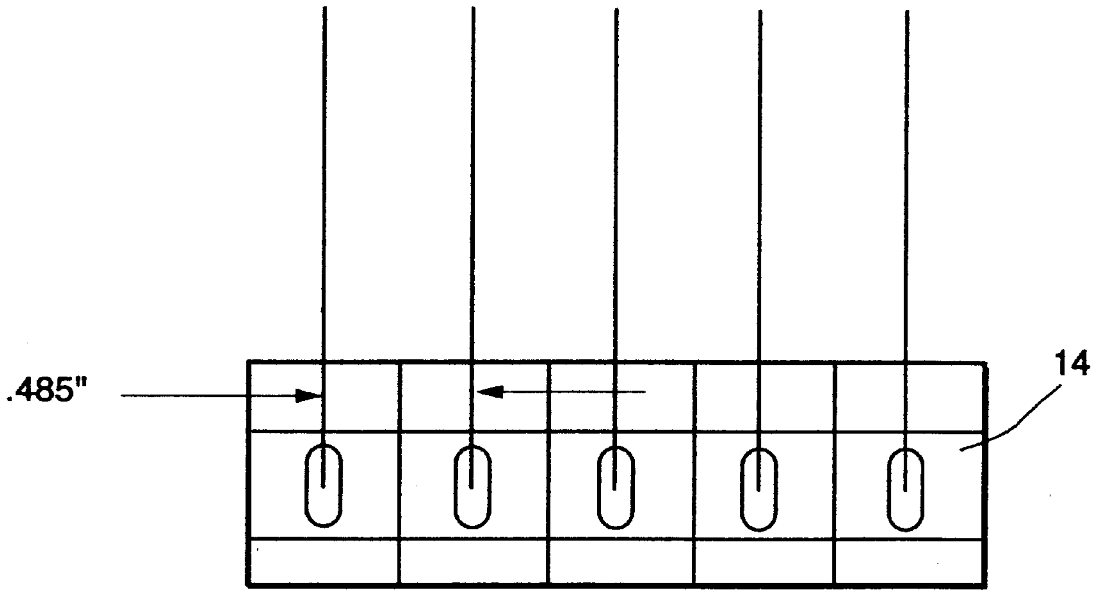
FIG. 5 shows the improved saddle width over the vintage Fender Stratocaster saddle width.

FIG. 5 illustrates the ideal embodiment of the bridge unit for the CELLOBLASTER where the bridge unit has instead saddles with a width of 0.485, which is the perfect compensation for the larger strings being used, and varying in sizes.

What is claimed is:

1. A stringed instrument, comprising:

a body;

a neck, said neck mounted on said body, said neck having a fingerboard and a headstock;

five tuning machines mounted on said headstock;

a bridge unit, said bridge unit mounted on said body;

five saddles, each of said saddles mounted on said bridge unit and corresponding to said five tuning machines on a one-to-one basis, each of said saddles supporting a string;

five strings, each one of said strings corresponding to one of said five tuning machines and one of said corresponding saddles, said five strings tuned in fifths and selected from the group consisting of:

A, E, B, F♯, C♯; and

C, G, D, A, E;

a magnetic pickup, said magnetic pickup coupled to said five strings and transmitting signals arising from said five strings; whereby harmonic separation diminishes loss of definition.

2. The stringed instrument of claim 1, further comprising:

a nut, said nut coupled to said neck and defining a scale length of 26.25 inches; and said headstock being a straight standard headstock with said five tuning machines being five staggered head machines.

3. The stringed instrument as set forth in claim 2, further comprising:

said five staggered head machines and having tops standing at selected heights above said headstock;

a first headmachine being associated with the lowest string, said first headmachine being a tallest headmachine; and second, third, fourth, and fifth headmachines being respectively associated with second lowest, third lowest, fourth lowest, and highest strings, said second, third, fourth, and fifth headmachines being respectively shorter than a previous headmachine.

4. The stringed instrument of claim 1, further comprising:

a nut, said nut coupled to said neck and defining a scale length of 25.75 inches; and said headstock being a compound headstock with said five tuning machines comprising staggered head machines.

5. The stringed instrument of claim 4, further comprising:

a string plane, said string plane defined approximately by said strings above said fingerboard; and a first headmachine having a first post, said first headmachine coupled to said headstock, said first post offset from said nut such that a string traveling over said nut and attached to said first post forms a first angle of approximately 20 degrees to 40 degrees with respect to said string plane.

6. The stringed instrument of claim 5, wherein said first angle is approximately twenty-two degrees.

7. The stringed instrument of claim 1 wherein the stringed instrument is approximately the size of the guitar.

8. The stringed instrument of claim 1, wherein a number of frets present on said fingerboard is selected from the group consisting of:

24, 25, 26, and 27.

9. The stringed instrument of claim 1 wherein a centralized spacing between said saddles is selected from the group consisting of:

0.440 inches and 0.485 inches.

10. The stringed instrument of claim 1, further comprising:

said five strings are respectively: A, E, B, F♯, C♯;

said A string being wound 0.075 gauge string;

said E string being wound 0.050 gauge string;

said B string being wound 0.035 gauge string;

said F♯ string being plain steel 0.019 gauge string; and said C♯ string being plain steel 0.0115 gauge string.

11. The stringed instrument of claim 10, wherein said wound gauge strings further comprise:

high copper content alloy wound around a steel core; whereby said wound gauge strings mimic a piano in punch and tone.

12. The stringed instrument of claim 1, further comprising:

said five strings are respectively: C, G, D, A, E:

said C string being wound 0.067 gauge string;

said G string being wound 0.043 gauge string;

said D string being wound 0.029 gauge string;

said A string being plain steel 0.016 gauge string; and said E string being plain steel 0.010 gauge string.

13. The stringed instrument of claim 12, wherein said wound gauge strings further comprise:

high copper content alloy wound around a steel core; whereby said wound gauge strings mimic a piano in punch and tone.

14. The stringed instrument of claim 1, wherein said body further comprises:

said body being made of wood.

15. The stringed instrument of claim 14, wherein said body further comprises:

said wood being selected from the group comprising: koa with a maple top and poplar with a spruce top.

16. The stringed instrument of claim 1, further comprising:

dots, said dots coupled to said fingerboard, said dots providing position markers in convenient locations consisted with said five strings tuned in fifths, said dots acting as visual cues to aid and enhance convenience in playing the stringed instrument.

17. The stringed instrument of claim 16, wherein said convenient locations of said dots further comprises:

placing dots indicating $3^{rd}$, $5^{th}$, $7^{th}$, $10^{th}$, $12^{th}$, $15^{th}$, $17^{th}$, $19^{th}$, $22^{th}$, $24^{th}$, and $27^{th}$, frets of said fingerboard.

* * * * *